(No Model.) 2 Sheets—Sheet 1.

J. C. COUSINS.
APPARATUS FOR HEATING AND DRYING.

No. 577,359. Patented Feb. 16, 1897.

Witnesses.
Fred S. Greenleaf
Thomas J. Drummond

Inventor
John C. Cousins.
By Crosby & Gregory
Attys.

(No Model.) 2 Sheets—Sheet 2.

J. C. COUSINS.
APPARATUS FOR HEATING AND DRYING.

No. 577,359. Patented Feb. 16, 1897.

Witnesses.
Fred S. Greenleaf
Thomas J. Drummond

Inventor.
John C. Cousins.
By Crosby & Gregory
Attys.

UNITED STATES PATENT OFFICE.

JOHN C. COUSINS, OF ARLINGTON, MASSACHUSETTS, ASSIGNOR TO THE NEW ENGLAND TURBINE AND FUEL COMPANY, OF MAINE.

APPARATUS FOR HEATING AND DRYING.

SPECIFICATION forming part of Letters Patent No. 577,359, dated February 16, 1897.

Application filed July 10, 1896. Serial No. 598,640. (No model.)

*To all whom it may concern:*

Be it known that I, JOHN C. COUSINS, of Arlington, county of Middlesex, State of Massachusetts, have invented an Improvement in Apparatus for Heating and Drying, of which the following description, in connection with the accompanying drawings, is a specification, like letters on the drawings representing like parts.

This invention has for its object the production of apparatus for the heating and drying and thorough mixing of materials together as a continuous process, particularly adapted for use in the production of artificial fuel, the apparatus being simple in construction, cheap, efficient, and rapid in its operation.

In carrying out my invention the material is fed into a revolving cylinder having air-tight stationary ends, the material being conveyed from one to the other end of the cylinder by a suitable conveyer, which forces the mixed, heated, and dried material out at the opposite end in a condition ready to be molded into desired form for use. Throughout its treatment the material is protected from the air, and consequently is more rapidly and thoroughly dried, the gases and other vapors generated in the cylinder by the heated contents passing off through a suitable outlet. Preferably I inclose the cylinder in a heating-chamber, the heat being generated by a series of fire-pots, or in other desired or suitable manner.

Figure 1:
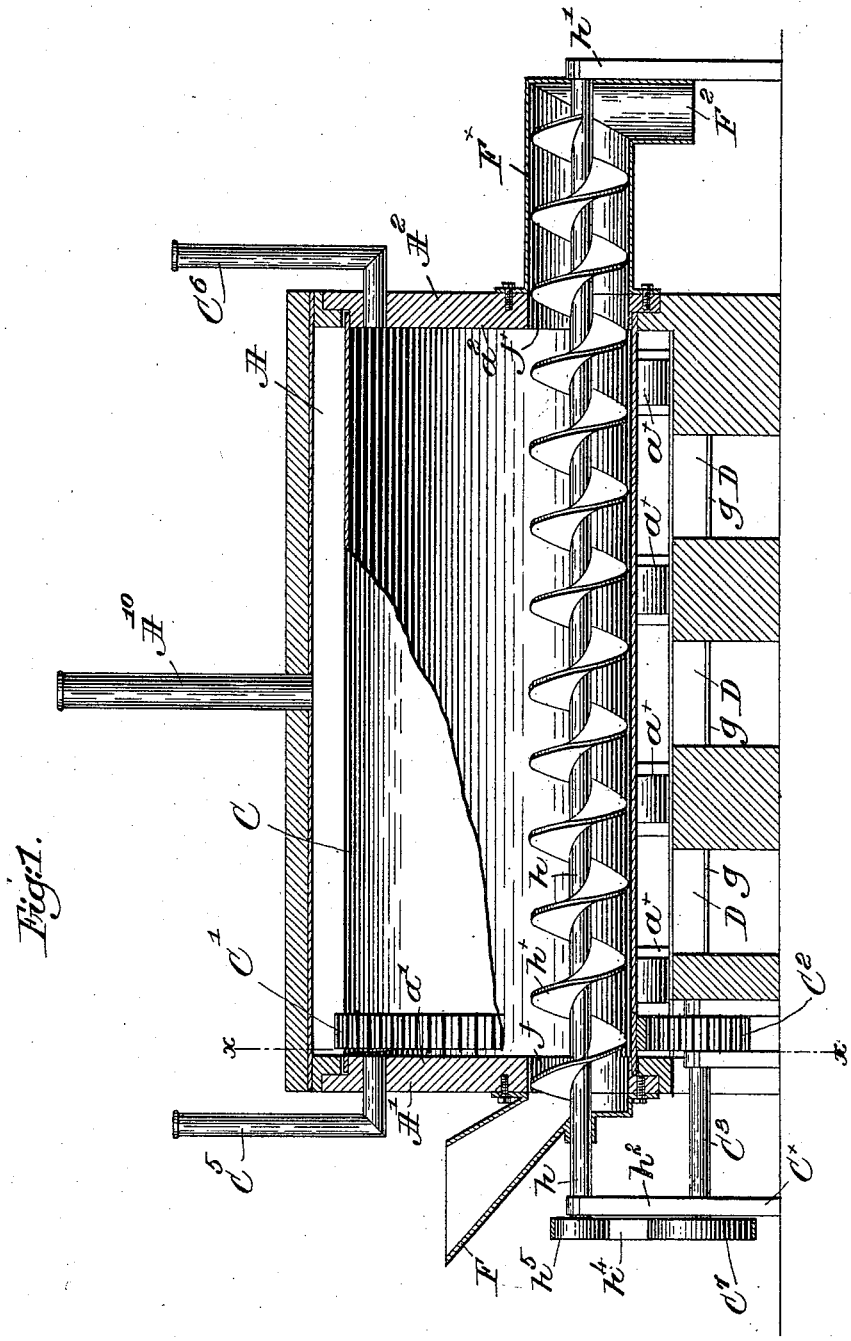
Figure 3:
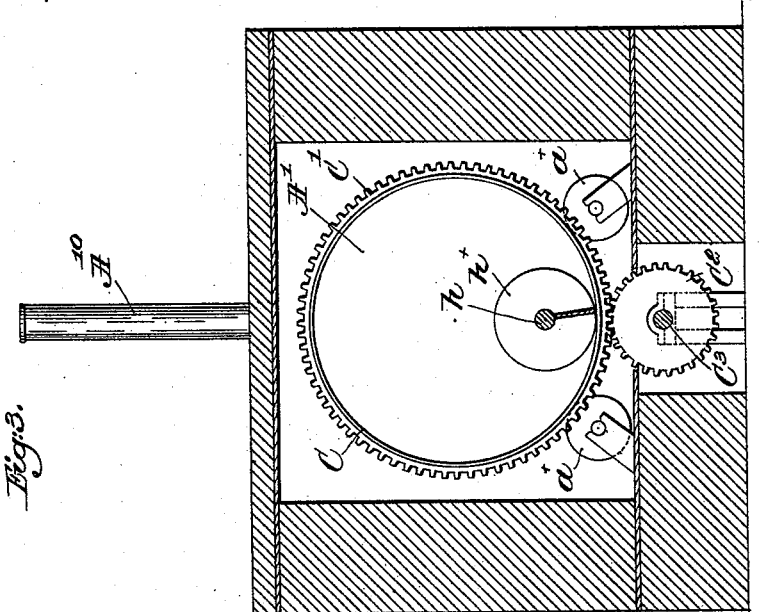
Figure 2:
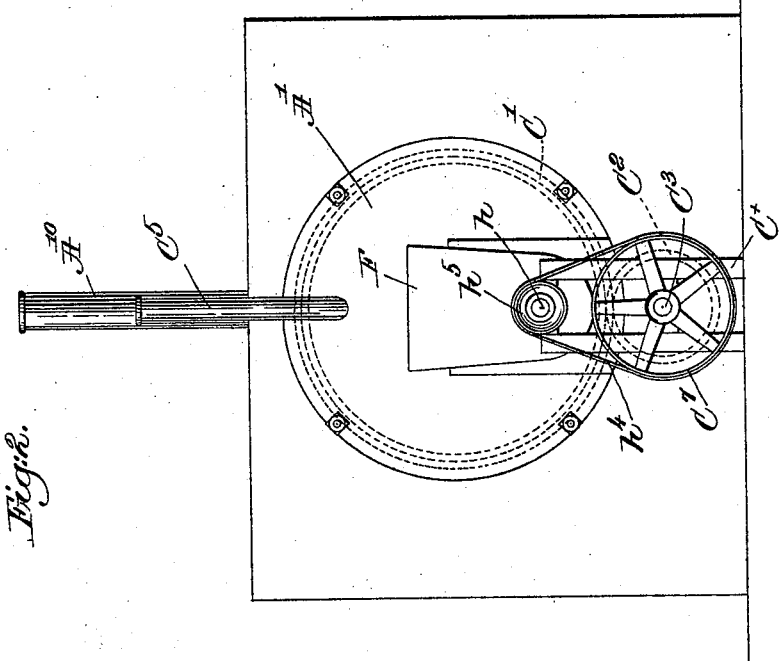

Figure 1 is a vertical longitudinal section of an apparatus embodying my invention, a part of the cylinder and the conveyer being shown in elevation. Fig. 2 is a left-hand end view of the apparatus, viewing Fig. 1; and Fig. 3 is a transverse sectional view on the line $x\,x$, Fig. 1, looking to the right.

I have herein shown the apparatus as mounted upon and more or less inclosed in a chamber A, of brick or other suitable material, the ends A' and $A^2$ thereof having interior circular portions $a'$ and $a^2$, which form fixed stationary ends for an open revoluble cylinder C, extended between the said ends and overlapping the annular peripheries of the portions $a'\,a^2$, respectively. This cylinder is supported on suitable friction-rolls $a^\times$, located on each side of the cylinder at its lower portion, as clearly shown in Figs. 1 and 3, so that the said cylinder may revolve with as little friction as possible.

An external gear C', secured to the cylinder, is in mesh with a pinion $C^2$ on a shaft $C^3$, supported in suitable bearings $C^\times$ outside of the chamber, as shown in Fig. 1, power being transmitted to the shaft $C^3$ in any suitable manner to thereby revolve the cylinder, the cylinder fitting over the stationary ends thereof, so as to make a substantially air-tight connection therewith, and one or more vapor-outlets, as $C^5\,C^6$, are extended through the stationary ends to thus communicate with the interior of the cylinder and permit the escape of steam or vapors generated by the heating of the contents as they pass through the cylinder.

I have herein shown the chamber A as provided at its bottom with a series of fire-pots D, having grates, and adapted to heat the said chamber and the cylinder and its contents. Any other device for heating the chamber may be adopted, however, if desired.

An opening $f$ is made in one of the ends, as A', and a feed-hopper F is mounted to lead into said opening from its lower end, while through the other end, $A^2$, an opening $f^\times$ communicates with a discharge-chute $f^\times$. (Shown in Fig. 1 as having a downturned outlet $F^2$.)

A horizontal conveyer-shaft $h$ is mounted in bearings $h'\,h^2$ to extend through the openings $f\,f^\times$ and through the cylinder C at its lower portion, said shaft having a spiral blade $h^\times$ thereon of usual construction to convey the material from the feed-hopper F through the cylinder and out of the discharge-chute $f^\times$, the diameter of the spiral blade being such that it enters snugly the main part of the chute $f^\times$ and partially closes the opening $f$.

Rotation is transmitted to the shaft $h^2$ by a suitable belt $h^4$, passing over a pulley $h^5$, and driven from a suitable pulley $C^7$ on the shaft $C^3$.

In operation the material to be mixed and heated and dried is pressed into the hopper F, and from thence it is forced into the cylinder, the rotation of the cylinder and conveyer being preferably in opposite directions and at any speed depending upon the character of the material to be treated and the nature of the desired resultant product. As the material is fed through the cylinder it is constantly stirred and agitated to thereby thoroughly mix it, and at the same time the heat applied to the exterior of the cylinder dries said material, the steam or other vapors passing off through the outlets $C^5$ $C^6$. The spiral conveyer tends to compress the material into and to fill the discharge-chute $F^\times$, so that after the apparatus has been running for a short time the inlet and outlet openings $f$ $f^\times$, respectively, for the cylinder will be closed by the raw and treated material against admission of the air, and the process is carried on in the cylinder, which is then practically air-tight.

The operation is a continuous one, and as only a comparatively small portion of the material is passing over the lower portion of the cylinder at any one time its treatment is effected rapidly and thoroughly.

The rotation of the cylinder is comparatively slow and the action of the conveyer upon the material is such as to prevent it from kinking or sticking to the inner surface of the cylinder while it is being passed from the inlet to the outlet thereof. The products of combustion pass to the heating-chamber A by means of a suitable chimney or escape-pipe $A^{10}$.

By constructing the cylinder with open ends and then providing it with the fixed or stationary air-tight heads or end portions I am enabled to maintain the cylinder substantially air-tight in a simple and effective way, and inasmuch as the ends are stationary the introduction and removal of the material from the cylinder are easily accomplished.

My invention is not restricted to the precise construction herein shown for rotating or supporting the cylinder or for heating the same, nor to the exact form of spiral conveyer, as these various features may be modified without departing from the spirit and scope of my invention.

Having fully described my invention, what I claim, and desire to secure by Letters Patent, is—

1. In an apparatus of the class described, an open-ended revolving cylinder, an inclosing heating-chamber having circular portions to form fixed air-tight ends for the cylinder, a hopper to deliver material through one of said ends into the cylinder, a discharge-chute leading from the other end, and a conveyer within and at the lower part of the cylinder, to move the material to be treated from the hopper through the cylinder and out of the discharge-chute, substantially as described.

2. In an apparatus of the class described, an open-ended revolving cylinder, stationary ends for and to maintain the cylinder air-tight, a feed-hopper in one of said ends, an oppositely-located discharge-chute leading from the other end, a conveyer closing the hopper and discharge-openings in the ends, and extending through the cylinder, and means to rotate said cylinder and conveyer in opposite directions, substantially as described.

3. In an apparatus of the class described, an open-ended revoluble cylinder, stationary air-tight ends therefor, means to heat the cylinder exteriorly, an inlet in one end for the material to be treated, an outlet in the other end, a spiral conveyer within the cylinder between the inlet and outlet, and closing them, means to rotate said cylinder and conveyer in opposite directions, and a vapor-outlet for the cylinder, substantially as described.

In testimony whereof I have signed my name to this specification in the presence of two subscribing witnesses.

JOHN C. COUSINS.

Witnesses:
 DEXTER B. WENTWORTH,
 HENRY GREEN.